United States Patent
Matsushita et al.

[15] 3,657,586
[45] Apr. 18, 1972

[54] CATHODE RAY TUBE FACEPLATE FORMED OF GRADED INDEX LAMINATED PLATES

[72] Inventors: Kazuo Matsushita, Nishinomiya-shi; Ken Koizumi, Itami-shi; Hidetoshi Togo, Itami-shi; Hajime Kimura, Itami-shi, all of Japan

[73] Assignee: Nippon Selfoc Kabushiki Kaisha, Tokyo, Japan

[22] Filed: Aug. 19, 1969

[21] Appl. No.: 851,398

[30] Foreign Application Priority Data

Aug. 21, 1968 Japan..................43/60096

[52] U.S. Cl............313/92 LF, 350/96 R, 350/96 B, 350/175 GN
[51] Int. Cl.......................H01j 29/18, G02b 5/14
[58] Field of Search................350/96, 96 B, 167, 175 GN; 313/92 LF

[56] References Cited

UNITED STATES PATENTS

| | | | |
|---|---|---|---|
| 1,882,829 | 10/1932 | Hall | 350/167 UX |
| 3,083,123 | 3/1963 | Navias | 350/175 GN UX |
| 3,320,114 | 5/1967 | Schulz | 350/96 X |
| 3,434,774 | 3/1969 | Miller | 350/96 WG |
| 2,740,954 | 4/1956 | Kleefeld | 350/167 X |

OTHER PUBLICATIONS

Miller Article in Bell System Technical Journal Vol. 44 No. 9 Nov. 1965 pp. 2,017–2,030
Kawakami et al. Article in Proceedings of the IEEE Dec. 1965 pp. 2,148 and 2,149
R. W. Wood Physical Optics 2nd Edition Published 1911 pp. 86–91

*Primary Examiner*—David H. Rubin
*Attorney*—Robert E. Burns and Emmanuel J. Lobato

[57] ABSTRACT

A transparent body of plate form is caused to have refractive index distribution conforming approximately to the equation $n_r = n_o (1 - ar^2)$, where $n_o$ is the refractive index in a central plane of the body parallel to its flat surfaces, $n_r$ is the refractive index at a distance $r$ from the central plane, and $a$ is a constant, whereby light or light pattern constituting an image introduced into the body through an edge surface is conducted through the body to the opposite edge surface from which the light or image is directed out.

2 Claims, 7 Drawing Figures

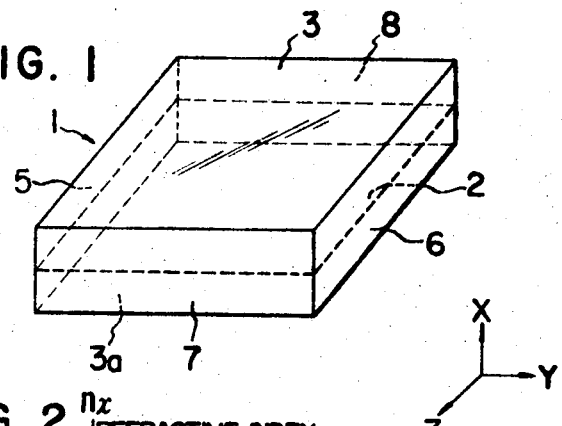
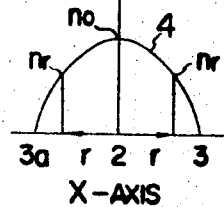
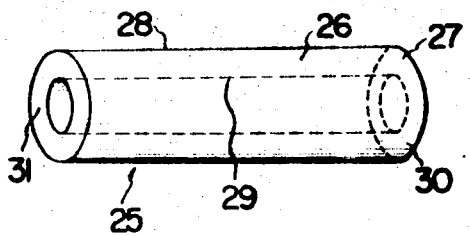
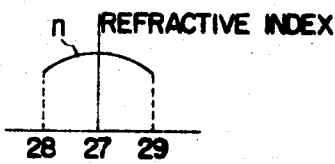
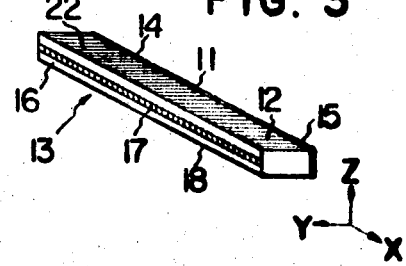
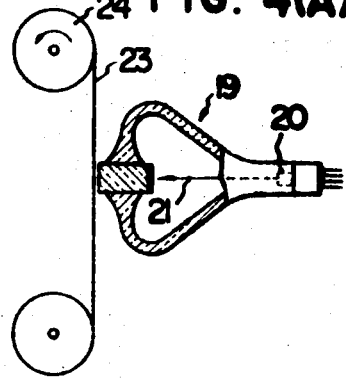

CATHODE RAY TUBE FACEPLATE FORMED OF GRADED INDEX LAMINATED PLATES

BACKGROUND OF THE INVENTION

This invention relates generally to light-conducting structures and more particularly to a new light-conducting structure consisting of a transparent material having a refractive index distribution in a one-dimensional direction.

Heretofore, a light-conducting structure of fibre form or cylindrical form comprising a core of a transparent light-conducting substance of a relatively high refractive index and a covering layer of a light-conducting substance of a relatively low refractive index has been known. Incident light introduced through one end of the core of such a light-conducting structure at an angle greater then the reflection critical angle of the interface between the core and covering layer is caused to propagate through the core as it is repeatedly reflected by the interface.

A light-conducting structure of this known clad type is utilized merely for conducting light owing to its reflection and cannot conduct visual images, having no resolving power. According to one known proposal for conducting images, the above-mentioned light-conducting structure is made in the form of a bundle of fibres, the relative positions of said fibers at the light incident surfaces and at the light exiting surfaces thereof are aligned, and the light and dark parts of the image are allocated $d$ to the fibrous light-conducting structure thereby to propagate the image.

In an image-conducting structure of this character, the definition of the image thus propagated and the resolving power are improved with decrease in the thickness of the fibrous light-conducting structures or in the thickness of the covering layer. However, the fusion bonding of a covering layer on a thin core or the alignment of the relative positions of the light incident and exit parts of thin fibrous light-conducting structures and the fusion bonding of the bundle of these structures are difficult and require much labor Furthermore, it is even more difficult to fabricate a large bundle of these image-conducting structures. Consequently, the size of images which can be thus propagated is limited.

According to one known proposal for conducting large images by means of light-conducting structures of the above-described character, the objective image is reduced in size by a lens system and introduced into the incident part and is enlarged again at the exit part to be extracted. Since the thickness of the light-conducting structures is limited, however, it has not been possible to achieve sufficient image definition, that is, resolving power.

SUMMARY OF THE INVENTION

It is an object of the present invention to utilize advantageously certain findings we have made to provide a light-conducting structure having no covering layer and having resolving power in a one-dimensional direction, particularly a light-conducting structure suitable for use in conducting light having a propagation component in a two-dimensional direction, that is, light which propagates within one plane.

According to the present invention is one aspect thereof, briefly summarized, there is provided a light-conducting structure composed of at least one transparent structure having a refractive index $n_o$ in a central plane passing through the central part thereof and a refractive index $n_r$ at a distance $r$ from the central plane, the refractive index distribution being such as to satisfy substantially the equation $n_r = n_o (1 - ar^2)$, where $a$ is a positive constant, whereby light introduced into the transparent structure through a first end surface is conducted therethrough to be directed out of an end surface opposite the first end surface.

According to the present invention in another aspect thereof, there is provided a composite combination formed by laminately combining a plurality of transparent structures each having the above described character with or without thin light-absorbing layers interposed between respective pairs of adjacent structures.

The nature, principle, details, and utility of the invention will be more clearly apparent from the following detailed description with respect to a preferred embodiment of the invention when read in conjunction with the accompanying drawing, in which the same or equivalent members are designated by the same reference numerals and characters.

BRIEF DESCRIPTION OF THE DRAWING

In the drawing:

FIG. 1 is a perspective view showing a basic example of a light-conducting structure according to the invention;

FIG. 2 is a graphical representation indicating the refractive index distribution in the axial direction designated as X in a sectional plane taken perpendicularly to the central plane 2 at any position of the light-conducting structure shown in FIG. 1;

FIG. 3 is a perspective view of an example of a face plate of a cathode-ray tube in which a light-conducting structure of the invention is used;

FIG. 5 is a perspective view showing an example of a pipe-shaped light-conducting structure of the invention; and FIG. 6 is a characteristic graph showing internal refractive index distribution of the light-conducting structure illustrated in FIG. 5.

DETAILED DESCRIPTION

Figure 4B:
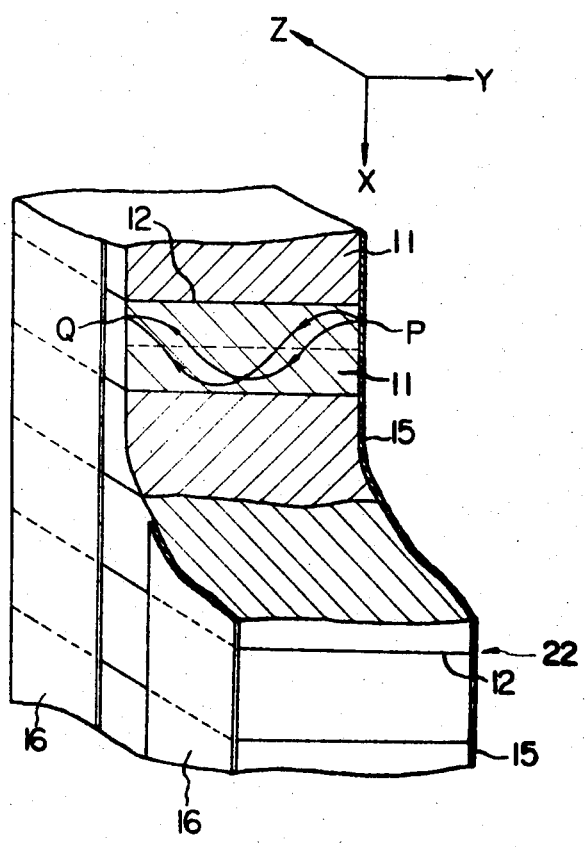
FIG. 4(A)(B) are diagrammatic views indicating a facsimile apparatus in which the faceplate shown in FIG. 3 is used.

As shown in FIG. 1, the light-conducting structure of the invention is composed of a transparent structure 1 having two opposite side surfaces 3 and 3a, two opposite end surfaces 5 and 6, and two other opposite end surfaces 7 and 8. The refractive index of this transparent structure 1 decreases in accordance with curve 4 as indicated in FIG. 2 from a plane 2 passing through the centre of the transparent structure toward the outer surfaces 3 and 3a thereof, that is, in the outward directions along axis X from the central plane 2. In the use of this transparent structure 1, light is introduced thereinto through one end surface such as 5 or 7 and light is led out through the opposite end surface 6 or 8.

A light-conducting fibre in which the refractive index decreases progressively from the inner part toward the outer part thereof has been proposed (as disclosed in, for example, the Proceedings of the IEEE, Vol. 53, p. 2148–p. 2149, Dec. 1965). The present invention makes possible the provision of a light-conducting structure having a refractive index distribution which can be readily manufactured in actual practice.

More specifically, the present invention is based on a phenomenon whereby, when incident light is introduced at a specific angle into one end surface of a transparent structure of a nature such that the refractive index thereof decreases from a plane passing through the central part thereof toward two opposite surfaces thereof perpendicular to the end surface, the light advancing through its propagation path is continually curved toward the direction in which the refractive index increases and can be directed out of the structure through the opposite end surface. The success of the present invention is a confirmation of the validity of this principle.

We have found further that a preferable refractive index distribution is such that the refractive index $n_r$ at any point within the structure conforms to the following equation.

$$n_r = n_o (1 - ar^2),$$

where: $n_o$ is the refractive index at the central plane;

$r$ denotes the distance of the above-mentioned point from the central plane; and $a$ is a positive constant.

We have found that a light-conducting structure having a refractive index distribution of this character is capable of propagating in the direction of the Y or Z axis the light intensity variation (bright and dark) in the direction of the refractive index distribution, that is, the X direction as indicated in FIG. 1. That is, the principle of this light-conducting structure is similar to that of the so-called gas lens, whereby this structure has a lens effect and has resolving power in the direction of the refractive index distribution.

We have found further that while this light-conducting structure can be curved if it is made thin, light within the structure does not escape from the lateral sides thereof when the structure is curved within a certain limit in the direction of the refractive index distribution. This limit to the possible degree of curvature is determined by the refractive index distribution and increases with increase in the gradient of the refractive index.

Since the light-conducting structure of the invention has a light focusing effect in a one-dimensional direction, it is particularly suitable for use in conducting light having traveling components in one and the same plane.

In a light-conducting structure such as shown in FIG. 1 in which its length along the axis $z$ is longer than that along the axis $y$, when a light-beam is transmitted through the interior of said structure along said axis $z$, the transmitting light-beam is gradually expanded toward axis $y$ and a part of the transmitting light is made to collide against side surfaces 5 and 6, whereby transmission of the light-beam is disturbed. This disadvantageous fact can be eliminated by constructing the light-conducting structure so that in a sectional plane perpendicular to center plane of the structure its centerline forms a close curve, whereby the light-beam cannot collide against the side surfaces in the interior of the structure, thus causing an efficient transmission of the light-beam.

By suitably selecting the length of the conducting structure, it is possible to obtain at the outlet directly, without change, variation of light intensity at the incident light inlet in the direction of the refractive index distribution (i.e., the direction of axis X in FIG. 1). When the length $t_o$ of a light-conducting structure having the above-described refractive index distribution, which length $t_o$ is in the direction of travel of the light to be conducted, is expressable by $$t_o = 2n \, \pi/\sqrt{2a},$$

where $n$ is an integer, the variation of light intensity of the light incident surface of the structure in the direction of the refractive index distribution can be conducted directly to the light-exiting surface. Furthermore, by cutting this light-conducting structure to a suitable length, a lens having both end surfaces flat an equivalent to a conventional cylindrical lens can be obtained.

Furthermore, in still another aspect of the invention, it is possible to form a composite structure consisting of a surface-to-surface lamination in the thickness direction of a plurality of transparent plate-shape structures each having the above-described refractive index distribution in the thickness direction. By introducing incident light at a certain angle into one end surface of this composite structure, it is possible to extract this light from the opposite end surface.

A structure resulting when two end parts of this composite structure are aligned is equivalent to a structure formed by aligning in a row a large number of conventional cylindrical lenses and can be rendered into a lenticular lens for reproducing three-dimensional images of three-dimensional photography which has resolving power in the direction of the refractive index distribution.

Furthermore, when the length $t_o$ of this composite structure in the light travel direction is representable by $$t_o = 2n \, \pi/\sqrt{2a},$$

where $n$ is an integer, the variation of light intensity in the direction of refractive index distribution of one end surface which is the light incident surface can be conducted to the opposite end surface which is the light-exiting surface. Accordingly, this composite structure is optional for use as the face plate of a cathode-ray tube for large-size facsimiles. When this structure is thus used, light which enters and advances with a large incidence angle at the incidence surface of each transparent plate structure having the above-described refractive index distribution enters into other adjacent transparent plate structures, whereby light transmission is liable to be disturbed. For the purpose of avoiding this disturbance light-absorbing layers are interposed between adjacent plate structures constituting the light-conducting structure.

For the transparent structure having the refractive index distribution according to the invention, a glass or a synthetic resin is suitable. In the case of glass, it is possible to cause it to have the above-described refractive index distribution by the ion-exchange method the provision of which is an object of U.S. Pat. application Ser. No. 806,368 filed Mar. 12, 1969.

More specifically, in one instance of practice, a glass plate of a thickness of 1 mm. composed of 56% of $SiO_2$, 14% of $Na_2O$, 20% of $Tl_2O$, and 10% of PbO, all percentages being by weight, was steeped for a specific time in a potassium nitrate bath maintained at a high temperature. The glass plate was then taken out of the bath, and the surrounding edges of the plate were cut off.

As a result, a glass plate having a refractive index $n_o$ at the central part thereof of 1.56 and a refractive index at the outer surface thereof of 1.48 and having a refractive index distribution such as to satisfy the relationship $n_r = n_o (1 - ar^2)$, $a = 0.21$ mm.$^{-2}$, in the thickness direction was obtained. When parallel-ray light was introduced at a certain incidence angle through an end or edge surface of this glass plate, it was possible to extract this light at the opposite end surface.

From this glass plate, a number of light-conducting pieces 11 each of a width of 3 mm. and a length $t_o = 2 \, \pi/\sqrt{2a} = 9.8$ mm. were prepared. These pieces 11 were fusion bonded with light absorbing layers 12 interposed therebetween so that the surfaces of low refractive index faced each other, that it, so that the light-conducting pieces 11 had refractive index distributions in the X-axis direction, thereby to form a faceplate 13 as shown in FIG. 3.

One end surface 14 of this face plate was covered with a coating of a phosphorescent substance 15, and the opposite end surface 16 was coated with a light absorbing material 18, a slit 17 being left to permit passage of light through the central part of the face plate in the Z-axis direction.

A face plate 13 fabricated in the above-described manner was used in a cathode-ray tube 19 for a facsimile apparatus as indicated in FIG. 4(A). In this apparatus, an electron beam 21 emitted by the electron gun 20 of the cathode-ray tube 19 scans the phosphorescent body 15 on the opposite side from the slit 17 of the face plate.

The phosphorescent body 15 luminesces in accordance with the intensity of the electron beam 21 by which it is scanned, and only the portion of the light passing through the slit 17 is projected onto the photosensitive recording medium (paper) 23. That is, light which has a propagation component in the Z-axis direction is absorbed by the light-absorbing material 18, while light traveling in the direction of the bonded surfaces 22 is absorbed by the light absorbing material 12.

As shown in FIG. 4(B), the light-beams emitted from a point P of the phosphorescent body 15 propagate through the interior of the light-conducting pieces 11 as shown by arrows and these light-beams are concentrated at a point Q the position of which corresponds to that of the point P. If the point P transfers toward the X direction, the point Q also transfers in accordance with the transference of the point P.

The recording paper 23 being scanned by the electron beam 21 is progressively taken up on a drum 24 in accordance with the scanning speed of the electron beam, and the patterns of light intensity variation in the X-axis direction produced successively by the electron beam are recorded on the recording paper, whereby images or characters are reproduced on the recording paper 23.

Thus since the light-conducting structure according to the invention has resolving power in the X-axis (FIG. 3) direction, it is possible to use a light-conducting structure of plate shape having a great thickness in the X-axis direction. Accordingly, the difficulty in the production of conventional face plates of cathode ray tubes of bundling light-conducting structures of fiber form and aligning the light-incident inlets and light-exiting outlets thereof is overcome.

The present invention therefore facilitates the fabrication of face plates for cathode-ray tubes and makes possible the production of large-size face plates. The invention, moreover, makes possible reproduction on recording paper of images and inscriptions of high definition.

EXAMPLE

A hollow glass consisting of 20% of $Tl_2O$, 10% of PbO, 14% of $Na_2O$ and 56% of $SiO_2$, by weight respectively, and having outer diameter of about 3mm and inner diameter of 1 mm., inner and outer circles of the sectional surface of said pipe being concentric, was immersed in a bath of potassium nitrate or 480° C. for 48 hours while maintaining the melt of the potassium nitrate in the hollow part of the pipe, said glass pipe was washed with hot water after said immersion, and then both ends of the glass pipe were cut off, whereby a hollow glass pipe 25 such as shown in FIG. 5 was obtained, refractive index of said glass pipe 25 being 1.57 at about center part 27 of the pipe wall 26 and 1.54 at outer surface 28 and inner surface 29, and the refractive index N of the pipe being decreased from said center part 27 toward outer and inner surfaces in proportion to square of the distance from the center part as shown in FIG. 6. When a light is made to enter, at an angle, into one end face 30 of the glass pipe 25 having the above-mentioned refractive index distribution, the incident light is transmitted toward the other end face 31 while being always refracted toward parts of larger refractive index 27 without collision with the outer and inner surfaces 28 and 29, and the light reached said end face 31 is emitted, at an angle, out of this end face. As such light-conducting structure as described above may be formed as a circular hollow pipe, in which its outer or inner diameter is gradually varied or rate of decrease of the refractive index at a sectional area is varied. Furthermore, a circular hollow pipe, inner and outer circles of which are not concentric, or a hollow pipe having any polygon-shaped sectional area may be used with same effect.

We claim:
1. A cathode-ray tube faceplate comprising a plurality of like plate-shaped transparent bodies each having a center plane, an entrance surface and an exit surface both disposed transverse to said center plane and opposite side surfaces extending between said entrance surface and said exit surface and parallel to said center plane, each said body having a refractive index distribution in a cross section in a plane perpendicular to said center plane which substantially satisfies the equation:

$$n_r = n_o (1 - ar^2)$$

wherein $n_o$ represents the refractive index at said center plane, $n_r$ represents the refractive index at a point in the plane of said cross section spaced a distance $r$ from said center plane, and $a$ is a positive constant, said bodies being laminated with one another side surface to side surface into a combined structure with a thin light absorbing layer interposed between adjacent side faces of said transparent bodies, said center planes of said bodies being parallel to one another and said entrance surfaces and exit surfaces constituting smooth continuous inner and outer surfaces respectively of said faceplate and being uniformly spaced from one another at a distance substantially equal to $2n\pi\sqrt{2a}$ where $n$ represents a positive integer, a coating of a phosphorescent substance on said inner surface of said faceplate activatable to produce an image which is transmitted to said outer surface as an erect image having the same size as that produced on the inner surface of the faceplate by said coating and masking means for limiting the erect image produced on said outer surface to a narrow strip extending perpendicular to said center planes of said transparent bodies.

2. A cathode-ray tube faceplate according to claim 1, in which said masking means comprises a layer of light-absorbing material formed on said outer surface and having a central slit extending perpendicular to said center planes of said transparent bodies for the passage of light through the central part of the faceplate.

* * * * *